(12) United States Patent
Wudl et al.

(10) Patent No.: US 6,933,361 B2
(45) Date of Patent: Aug. 23, 2005

(54) THERMALLY RE-MENDABLE CROSS-LINKED POLYMERS

(75) Inventors: Fred Wudl, Santa Barbara, CA (US); Xiangxu Chen, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 108 days.

(21) Appl. No.: 10/194,332

(22) Filed: Jul. 12, 2002

(65) Prior Publication Data

US 2004/0014933 A1 Jan. 22, 2004

(51) Int. Cl.$^7$ .............................................. C08F 232/00
(52) U.S. Cl. ...................... 528/365; 528/363; 528/392; 528/393
(58) Field of Search ................................ 528/365, 363, 528/392, 393

(56) References Cited

U.S. PATENT DOCUMENTS

| | | |
|---|---|---|
| 5,641,856 A | 6/1997 | Meurs |
| 5,726,391 A | 3/1998 | Iyer et al. |
| 5,760,337 A * | 6/1998 | Iyer et al. .................. 174/52.2 |
| 5,844,020 A | 12/1998 | Paine et al. |
| 6,271,335 B1 | 8/2001 | Small et al. |
| 6,337,384 B1 | 1/2002 | Loy et al. |

OTHER PUBLICATIONS

Chen et al., "Thermally Re-mendable Cross-Linked Polymeric Material," *Science*, 295, 1698–1702 (Mar. 2002).
Imai et al., "Thermally Reversible IPN Organic–Inorganic Polymer Hybrids Utilizing the Diels–Adler Reaction," *Macromolecules*, 2000, 33, 4343–4346.
Laita et al., "The Application of the Diels–Adler Reaction to Polymers Bearing Furan Moieties Reactions with Maleimides," *Eur. Polym. J.*, vol. 33, No. 8, pp. 1203–1211, 1997.

* cited by examiner

*Primary Examiner*—P. Hampton Hightower
(74) *Attorney, Agent, or Firm*—Shapiro & Dupont LLP

(57) ABSTRACT

Thermally re-mendable cross-linked polymeric materials that can be repeatedly mended or repaired by simple thermal treatment. The polymeric materials are made by polymerizing furan monomers and maleimide monomers via the Diels-Alder (DA) reaction wherein the furan monomers have at least three furan moieties and the maleimide monomers have at least three maleimide moieties. The intermonomer linkages that form between the furan and maleimide monomers are thermally reversible and do not require the addition of catalysts, additional monomer or special surface treatments.

12 Claims, 7 Drawing Sheets

Furan 1

Furan 2

Furan 3

Furan 4

Furan 5

Furan 6

Furan 7

Furan 8

Furan 9

Furan 10

Furan 11

Furan 12

Furan 13

Furan 14

Furan 15

Maleimide 1

Maleimide 2

Maleimide 3

Maleimide 4

Maleimide 5

Maleimide 6
n=1-12

Maleimide 7
n=1-12

Maleimide 8
n=2-3
m=1-3

Maleimide 9
n=1-3
X=O, S, NR$_4$

THERMALLY RE-MENDABLE CROSS-LINKED POLYMERS

BACKGROUND OF THE INVENTION

1. Field of the Invention

The present invention relates generally to polymeric materials that are re-mendable and self-healing. More particularly, the present invention is directed to thermally re-mendable polymeric materials that are made from multi-valent furan monomers and multi-valent maleimide monomers via the Diels-Alder (DA) reaction.

2. Description of Related Art

The publications and other reference materials referred to herein to describe the background of the invention and to provide additional detail regarding its practice are hereby incorporated by reference. For convenience, the reference materials are numerically referenced and grouped in the appended bibliography.

In past decades, highly cross-linked polymers have been studied widely as matrices for composites, foamed structures, structural adhesives, insulators for electronic packaging, etc. (1, 2). The densely cross-linked structures are the basis of superior mechanical properties such as high modulus, high fracture strength, and solvent resistance. However, these materials are irreversibly damaged by high stresses (3, 4) due to the formation and propagation of cracks. The latter lead to dangerous loss in the load-carrying capacity of polymeric structural engineering materials (5, 6).

The exploration of re-mending and self-healing of polymeric materials has become increasingly more exciting in the recent past, culminating in a genuinely self-healing material (4). The hot plate welding and crack healing of thermoplastics, where intermolecular noncovalent interactions (chain entanglements) at the interface are responsible for mending, have been well established (7–9). Small molecules-induced crack healing has also been studied for thermoplastics (10, 11), and a composite of a linear polymer with a thermoset that has crack-healing was reported (12). The concept of self-repair was introduced to heal cracks by embedding hollow fibers that can release repair chemicals when a crack propagates (7, 13, 14). The most recent report of crack self-healing (autonomic healing) of an epoxy resin consists of a clever use of catalytic network formation of an encapsulated add-monomer, which is held within a capsule embedded in the epoxy matrix (4). But questions remain concerning the long-term stability of the catalyst and the ability of the material to self-heal multiple times.

There presently is a need for truly "re-mendable" polymers that are highly cross-linked, transparent and that exhibit multiple cycles of autonomic crack mending with simple, uncatalyzed thermal treatment wherein covalent bonds are formed at the interface of the mended parts. This is to be contrasted with hot plate welding and crack healing of thermoplastics where only intermolecular, noncovalent interactions (chain entanglements, hydrogen bonding, etc.) are responsible for the mend and no new covalent bonds are formed between the mended parts.

SUMMARY OF THE INVENTION

In accordance with the present invention, transparent organic polymeric materials are provided that can be welded together or repeatedly mended or repaired using mild heat treatment. The polymers are tough, solid materials at room temperature with mechanical properties similar to commercially available epoxy resins. At temperatures above approximately 120° C., approximately 30% of the inter-monomer covalent linkages disconnect. The disconnected linkages then reconnect upon cooling. This process is fully reversible and can be used to weld parts together or repair fractured parts multiple times. No additional ingredients, such as catalysts, are required. Further, no additional monomers or special surface treatment is required in order to join surfaces together or repair fractures.

The present invention is based on the discovery that furan monomers having at least three furan moieties may be mixed with maleimide monomers that have at least three maleimide moieties to form a pre-polymer mixture that may be thermally cured via the Diels-Alder (DA) reaction to form highly cross-linked polymeric materials as described above that can be thermally welded together or thermally re-mended or healed. The present invention not only covers the polymeric materials themselves, but methods for making the polymeric materials and methods for heat treating the polymeric materials including repairing fractures and joining polymeric bodies together using thermal welding techniques.

The above described and many other features and attendant advantages of the present invention will become better understood by reference to the following detailed description when taken in conjunction with the accompanying drawings.

DETAILED DESCRIPTION OF THE INVENTION

In accordance with the present invention, polymeric materials are provided that are made by mixing furan monomers with maleimide monomers. The furan monomers and maleimide monomers undergo the thermally reversible Diels-Alder (DA) reaction to form a cross-linked polymeric material wherein thermally reversible covalent bonds are formed between the furan moieties and maleimide moieties in the furan monomers and maleimide monomers.

As a requirement of the present invention, the furan monomers must have at least three furan moieties. Exemplary furan monomers have the following formulas:

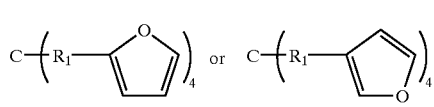 (1)

where $R_1$ is a straight or branched oxygen, nitrogen or sulfur containing carbon compound having from 2 to 20 carbon atoms. Exemplary $R_1$ groups include:

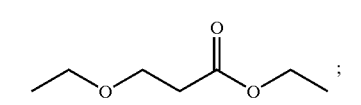 ($R_{1a}$)

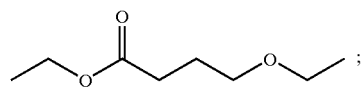 ($R_{1b}$)

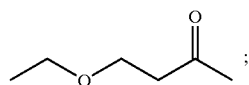 ($R_{1c}$)

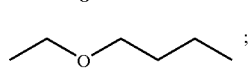 ($R_{1d}$)

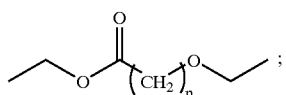 ($R_{1e}$)

where n = 1–12

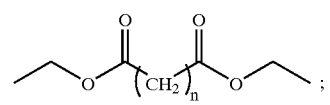 ($R_{1f}$)

where n = 2–3

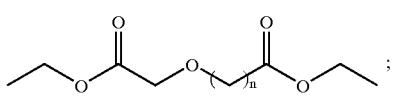 ($R_{1g}$)

where n = 1–12

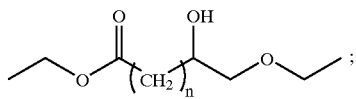 ($R_{1h}$)

where n = 1–10

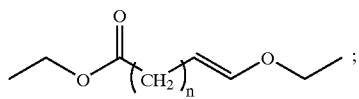 ($R_{1i}$)

where n = 1–10

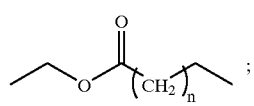 ($R_{1j}$)

where n = 1–12

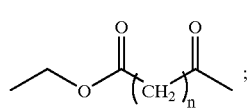 ($R_{1k}$)

where n = 1–12

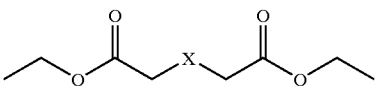 ($R_{1l}$)

where X is O, S or $NR_4$;
$R_4$ is an alkyl group having from 1 to 4 carbon atoms
Other exemplary furan monomers have the following formulas:

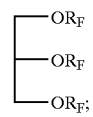 (2)

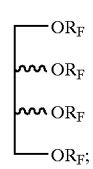 (3)

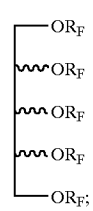 (4)

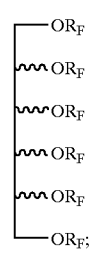 (5)

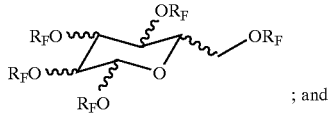 (6)

; and

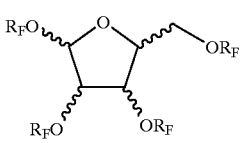 (7)

where $R_F$ is

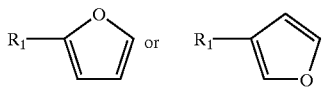

The wavy lines set forth in the formulas denote bonds between carbon atoms that do not require a specific chirality.

A wide variety of furan monomers are possible provided that they have at least 3 furan moieties. Furan monomers with up to 6 furan moieties are suitable. The furan moieties preferably do not include any substitution groups that might interfere with the Diels-Alder reaction. The above groups of multi-furan moiety monomers are exemplary only with it being understood that other furan moieties may be used, provided that they meet the above requirements regarding number of furan moieties and Diels-Alder reactivity with multi-maleimide moiety monomers. As set forth above, the furan moiety may be substituted at either the 2 or 3 position on the furan ring. Substitutions at the 2 position are preferred.

Figure 3A:
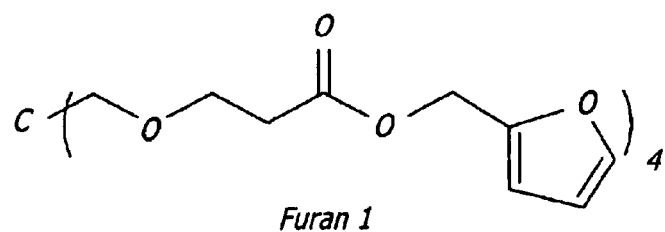
FIGS. 3A–3O depict the structural formulation for preferred exemplary furan monomers in accordance with the present invention.
Figure 3B:
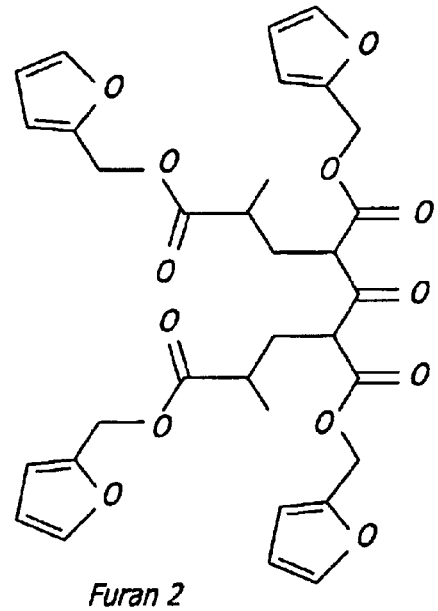
Figure 3C:
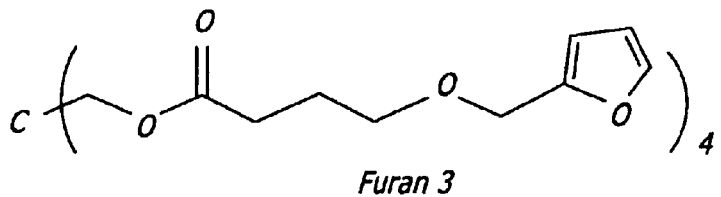
Figure 3D:
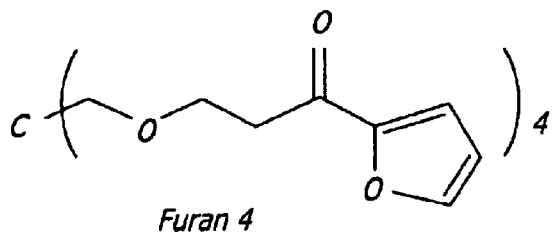
Figure 3E:
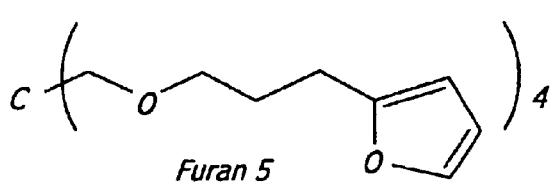
Figure 3F:
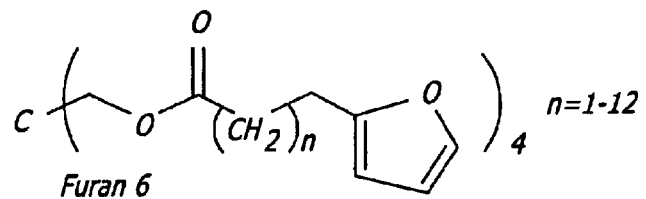
Figure 3G:
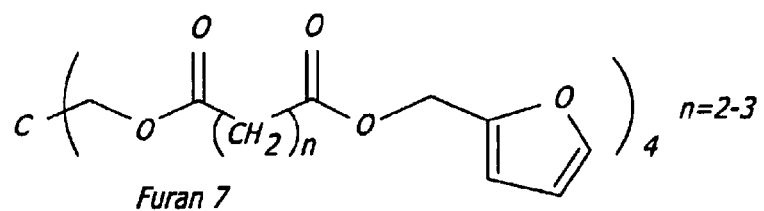
Figure 3H:
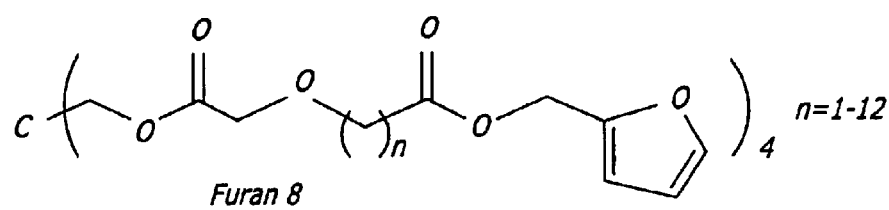
Figure 3I:
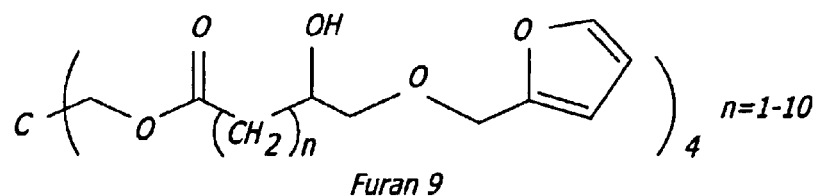
Figure 3J:
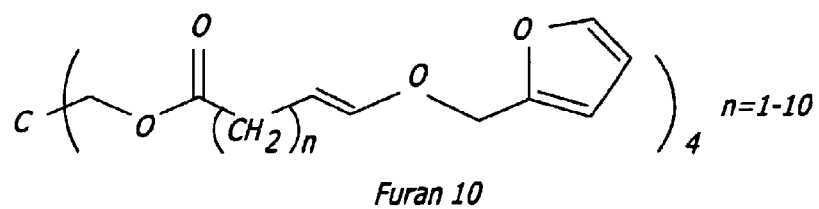
Figure 3K:
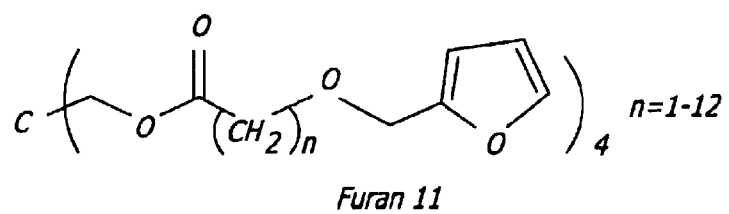
Figure 3L:
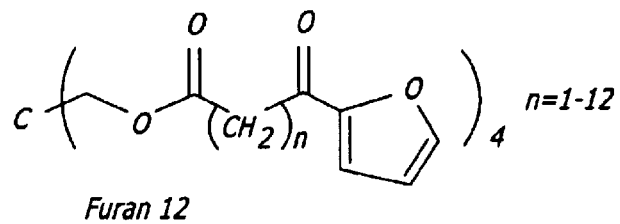
Figure 3M:
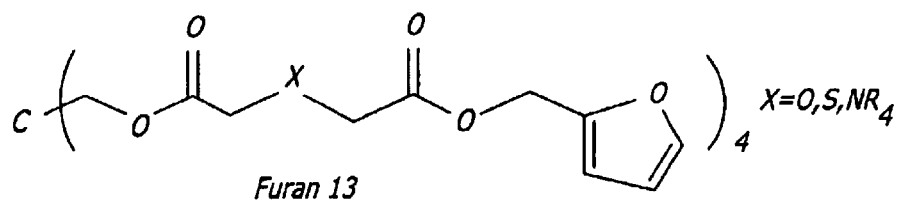
Figure 3N:
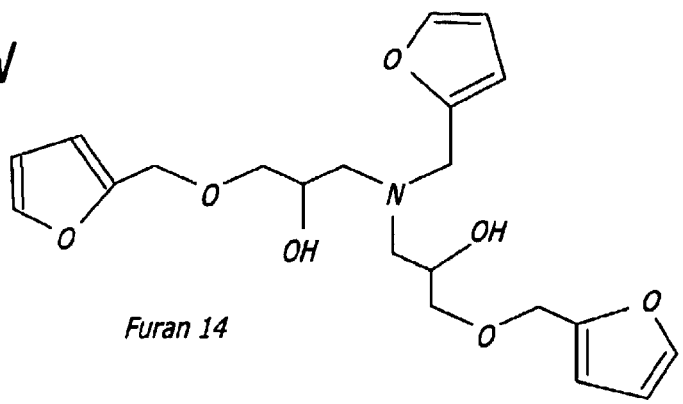
Figure 3O:
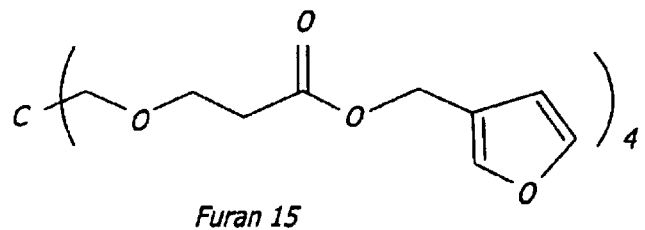
Figure 4A:
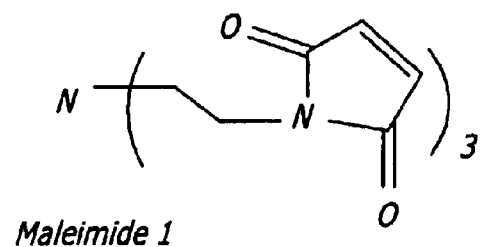
FIGS. 4A–4I depict structural formulas for preferred exemplary maleimide monomers in accordance with the present invention.
Figure 4B:
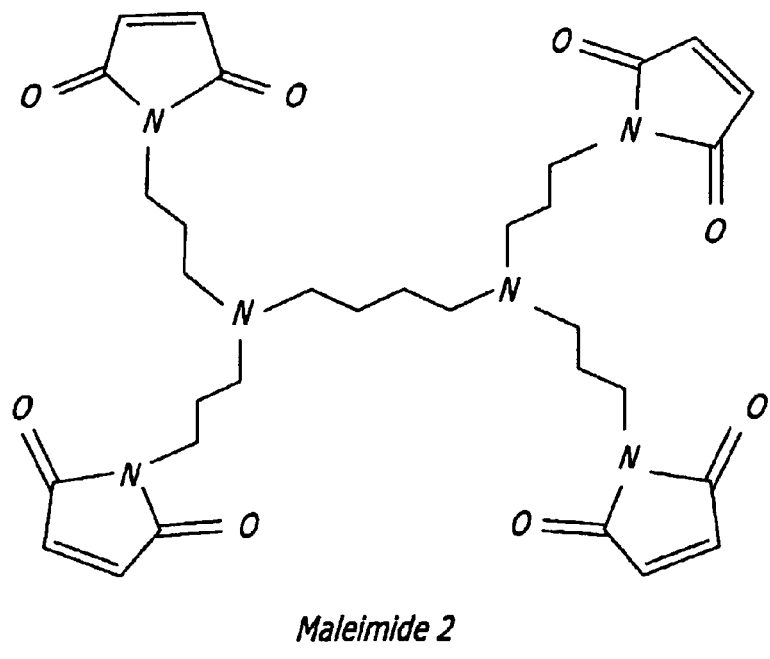
Figure 4C:
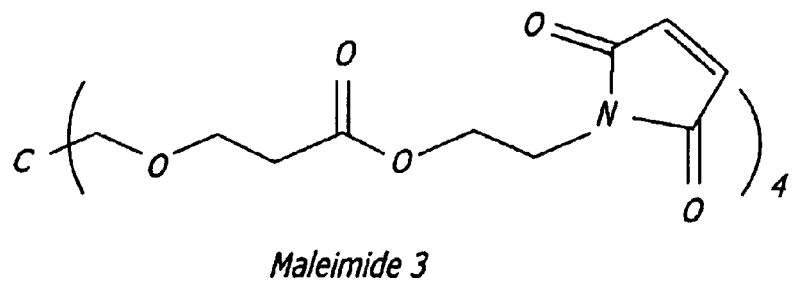
Figure 4D:
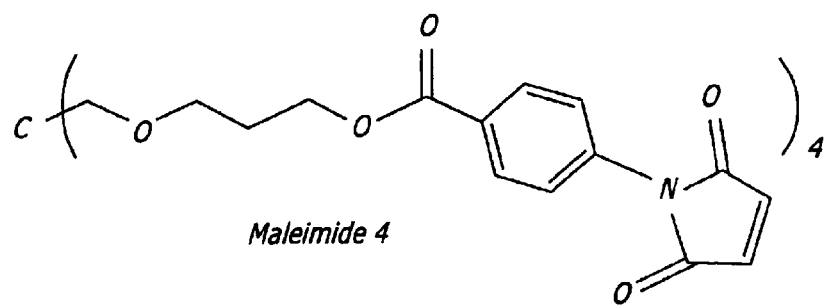
Figure 4E:
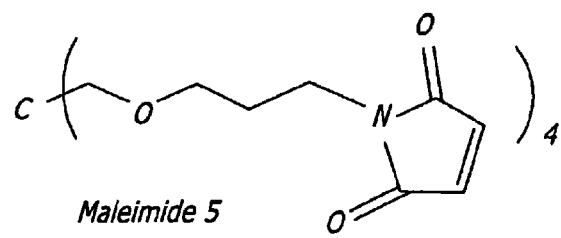
Figure 4F:
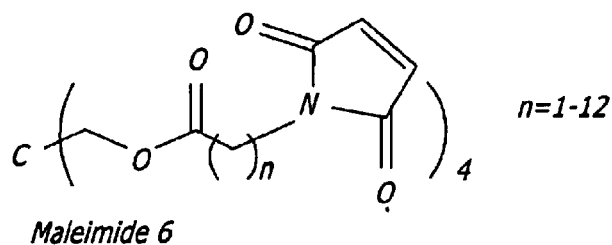
Figure 4G:
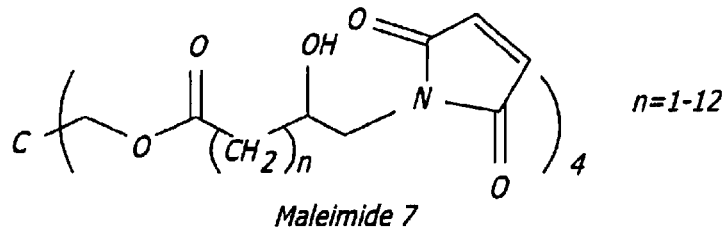
Figure 4H:
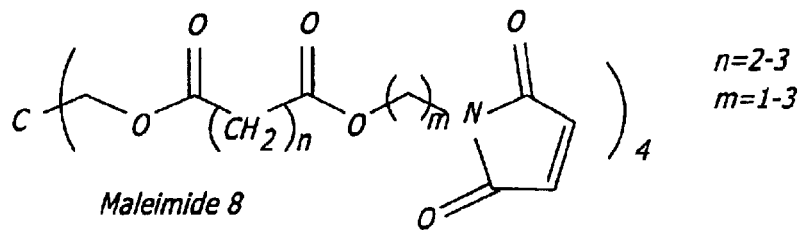
Figure 4I:
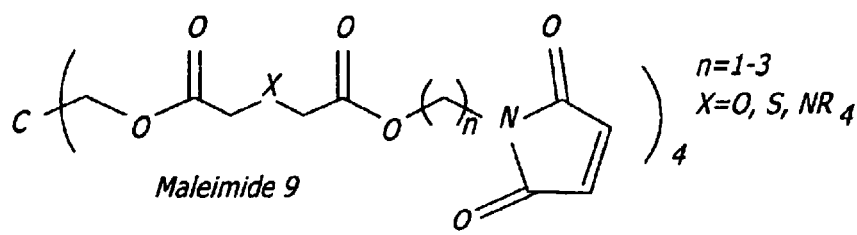

Preferred exemplary furan monomers are set forth in FIGS. 3A–3O. It is preferred that the furan monomers have at least four furan moieties such as furan compounds Furan 1–13 and Furan 15 shown in FIGS. 3A–3M and 3O, respectively. For the Furan 13 monomer, $R_4$ may be an alkyl group having from 1 to 4 carbon atoms.

The furan monomers having the formulas (1) to (7) set forth above can be made using known synthesis techniques using commercially available starting ingredients. Exemplary synthesis procedures are as follows:

For Furan 2 monomer (FIG. 3A), diethyl 1,3-acetonedicarboxylate is refluxed with furfuryl alcohol to give difurfuryl 1,3-acetonedicarboxylate. Triethylamine and furfuryl acrylate are added to the solution of difurfuryl 1,3-acetonedicarboxylate. Stirring is continued to form the Furan 2 monomer crude product.

Furan 3 monomer (FIG. 3B) is prepared by adding 3.4 g pentaerythritol and 2.0 g pyridine to a solution of 8.6 g γ-butyrolactone in approximately 100 ml N,N-dimethyl formamide (DMF). The solution is heated to 90° C. Solvents are removed by reduced pressure and the residue is dissolved in 100 mL THF 11.7 g furfuryl chloride is added to produce the Furan 3 monomer.

Furan 4 (FIG. 3D) monomer is made by adding 5.6 g 6,6-bis(carboxy-2-oxabutyl)-4,8-dioxaundanecane-1,11-dicarboxylic acid, 50 mL $CH_2Cl_2$ and 16 mL $SOCl_2$ to a 250 mL round bottom flask with a magnetic stirrer. The mixture is heated to reflux. Then, $CH_2Cl_2$ is distilled. Toluene is then added and distilled. The residue is dissolved in 50 mL of freshly distilled THF. A mixture of 4.2 g furan and 7 mL pyridine (dried over $CaH_2$) are added drop-wise and stirring is continued to produce the Furan 4 monomer.

Furan 5 monomer (FIG. 3E) is made by refluxing a mixture of 6.2 g Furan 4, 56 mL of 85% hydrazine hydrate in triethylene glycol (or diethylene glycol). The water formed is removed by a take-off condenser. The temperature of the solution is allowed to rise to approximately 195° C. when refluxing is continued. The cooled solution is diluted with 1 L water and the Furan 5 monomer is extracted by methylene chloride.

An exemplary Furan 6 monomer (FIG. 3F) where n=2 is made by preparing a mixture of Furan 12, 1,2-ethanedithiol, glacial acetic acid, and boron trifluoride etherate that is placed in a tightly sealed container and allowed to stand at room temperature for 2 days. The intermediate is then reduced by hydrogen gas in the presence of Raney Nickel catalyst to form the Furan 6 monomer.

An exemplary Furan 7 monomer (FIG. 3G) where n=12 is made by adding 10 g of succinic anhydride to a solution of 3.4 g pentaerythritol in 100 mL N,N-dimethylformamide (DMF) with magnetic stirring. The solution is heated to 90° C. for 10 approximately 30 hours with a catalyst, such as potassium tert-butoxide. Solvent is then removed under reduced pressure. The residue is treated with an extra amount of thionyl chloride to give the acid chloride compound. 10 g furfuryl alcohol and 9 g pyridine are added together with the acid chloride compound to produce Furan 7 monomer.

An exemplary Furan 8 monomer (FIG. 3H) where n=1 is made by adding 16 g bromoacetyl chloride to a solution of 3.4 g pentaerythritol in approximately 100 mL N,N-dimethylformamide (DMF) with magnetic stirring. Sodium hydroxide is added and stirring is continued. Then, 22 g 2-furfuryl bromoacetate is added. Stirring is continued to produce the Furan 8 monomer.

An exemplary Furan 9 monomer (FIG. 3I) where n=2 is made by heating to reflux a solution of 11.6 g oxiranepropanoic acid an excess amount of thionyl chloride in methylene chloride. Then, $CH_2Cl_2$ is distilled. Toluene is then added and distilled. The residue is dissolved in 50 mL of freshly distilled THF. 3.4 g pentaerythritol dissolved in 30 mL DMF and 9 g pyridine is added together to the solution drop-wise. 10 g furfuryl alcohol is added with base, such as potassium tert-butoxide. Stirring is continued to produce the Furan 9 monomer.

Furan 10 monomers (FIG. 3J) may be made by adding tosyl chloride and triethyl amine to Furan 9 monomers.

Exemplary Furan 11 monomers may be made by hydrogenating Furan 10 monomers with hydrogen gas in the presence of palladium and carbon. Furan 11 monomer where n=3 may also be made by adding 18.5 g 4-bromobutyryl chloride to a solution of 3.4 g pentaerythritol in approximately 100 mL N,N-dimethylformamide (DMF) with magnetic stirring. Stirring is continued at room temperature. Solvent is removed by reduced pressure and the residue is dissolved in 100 mL anhydrous THF. This solution is then added to a solution of 10 g of furfuryl alcohol in 50 mL THF charged with 4 g sodium. Stirring is continued to produce Furan 11 monomer.

An exemplary Furan 12 monomer (FIG. 3L) where n=2 is made by adding 10 g of succinic anhydride to a solution of 3.4 g pentaerythritol in 100 mL N,N-dimethylformamide (DMF) with magnetic stirring. The solution is heated to 90° C. for 10 to 30 hours with a base, such as potassium tert-butoxide. Solvent is then removed under reduced pressure. The residue is treated with an excess amount of thionyl chloride to give the acid chloride. Furan is then added to the solution. Stirring is continued to produce the Furan 12 monomer.

An exemplary Furan 13 monomer (FIG. 3M) where x=oxygen may be made by adding 11.6 g of diglycolic anhydride to a solution of 3.4 g pentaerythritol in 100 mL N,N-dimethylformamide (DMF) with magnetic stirring. The solution is heated to 90° C. for 10 to 30 hours with a base, such as potassium tert-butoxide. Solvent is removed under reduced pressure. The residue is treated with an excess amount of thionyl chloride to give the acid chloride. 10 g furfuryl alcohol and 9 g pyridine are then added to produce the Furan 13 monomer.

Furan 14 monomer (FIG. 3N) is made by heating a solution of 15.4 g furfuryl glycidyl ether and 9.7 g furfurylamine in 10 mL THF to reflux for 10 to 20 hours.

Furan monomers having formula (2) are made in the same manner as the above-described monomers except that glycerin is substituted for pentaerythritol as a starting material. Furan monomers having formula (3) are made in the same manner as above except that meso-erythritol is substituted for pentaerythritol. Furan monomers having formula (4) are made in the same manner as above except that xylitol is substituted for pentaerythritol. Furan monomers having formula (5) are made in the same manner as above except that mannitol is substituted for pentaerythritol. Furan monomers having formula (6) are made in the same manner as above except that glucose is substituted for pentaerythritol. Furan monomers having formula (7) are made in the same manner as above except that xylose is substituted for pentaerythritol.

The maleimide monomers must have at least three maleimide moieties. Exemplary maleimide compounds have the formula:

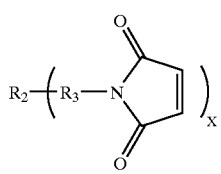

(8)

where $R_2$ is C or N, $R_3$ is a straight or branched carbon compound having from 2 to 20 carbon atoms and which may or may not contain oxygen or other heretoatoms and where X is from 3 to 6.

Exemplary $R_3$ groups are

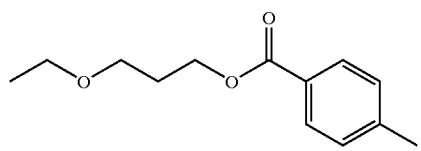

($R_{3a}$)

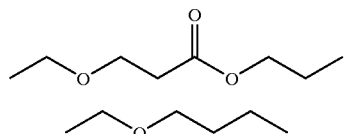

($R_{3b}$)

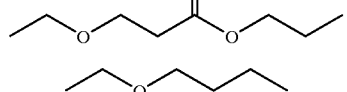

($R_{3c}$)

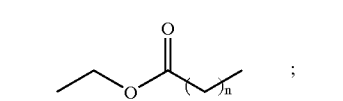

where n = 1–12

($R_{3d}$)

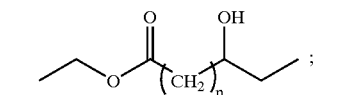

where n = 1–12

($R_{3e}$)

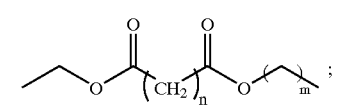

where n = 1–12 and m = 1–3;

($R_{3f}$)

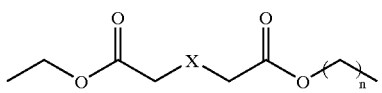

($R_{3g}$)

where n=1–3 x=O, S, $NR_4$ where $R_4$=alkyl group having from 1 to 4 carbon atoms.

Preferred exemplary monomers Maleimide 1-Maleimide 9 are set forth in FIGS. 4A–4I, respectively. The monomers include those where: $R_2$ is N, $R_3$ is an ethylene group and X is 3 (Maleimide 1-FIG. 4A); $R_2$ is C, $R_3$ is $R_{3b}$ and X is 4 (Maleimide 3-FIG. 4C); $R_2$ is C, $R_3$ $_X$ $_{is}$ 4 (Maleimide 4-FIG. 4D)); and $R_2$ is C, $R_3$ is $R_{3c}$ and X is 4 (Maleimide 5-FIG. 4E).

Other exemplary maleimide monomers have the following formulas:

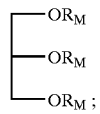

(9)

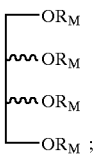

(10)

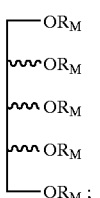

(11)

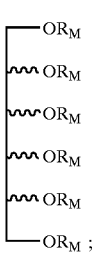

(12)

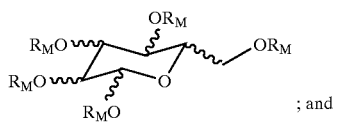

; and (13)

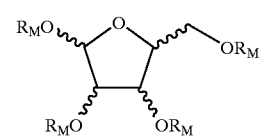

(14)

where $R_M$ is

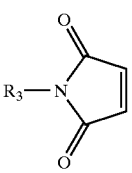

A wide variety of maleimide monomers may be used, provided that they have at least 3 maleimide moieties and are able to undergo Diels-Alder cross-linking reactions with the multi-furan monomers. Like the furan monomers, it is preferred that no substitution groups are present on the maleimide moieties that might interfere with the Diels-Alder reaction.

The maleimide monomers having the formulas (8) to (14) set forth above can be made using known synthesis techniques using commercially available starting ingredients. Exemplary synthesis procedures are as follows:

Maleimide 5 monomer (FIG. 4E) is made by dissolving 9.1 g tetraaminopropylpentaerythritol in DMF with magnetic stirring. The solution is heated to approximately 75° C. A solution of 5 g exo-3,6-epoxy-1,2,3,6-tetrahydrophthalic anhydride dissolved in 50 mL of anhydrous DMF is added to the flask drop-wise. Stirring is continued. Then 60 mL of $Ac_2O$, 3 mL of $Et_3N$ and 0.5 g of $Ni(OAc)_2.4H_2O$ are added, respectively. Stirring is continued for 3 hours at approximately 75° C. 20 mL of water is then added and the solvent is distilled under vacuum at 60° C. to produce Maleimide 5 monomer.

An exemplary Maleimide 6 monomer (FIG. 4F) where n=3 is made by adding 18.5 g 4-bromobutyryl chloride a solution of 3.4 g pentaerythritol in 100 mL N,N-dimethylformamide (DMF) with magnetic stirring. Stirring is continued. Solvent is removed by reduced pressure. The residue is dissolved in 100 mL anhydrous THF. Then a solution of 17 g furan maleimide adduct and triethylamine is added drop-wise. Stirring is continued after addition. Solution is distilled by reduced pressure and the residue is refluxed in toluene to produce Maleimide 6 monomer.

An exemplary Maleimide 7 monomer (FIG. 4G) where n=2 is made by heating to reflux a solution of 11.6 g oxiranepropanoic acid and an excess amount of thionyl chloride in methylene chloride. Then, $CH_2Cl_2$ is distilled. Toluene is then added and distilled. The residue is dissolved in 50 mL of freshly distilled THF. 3.4 g pentaerythritol dissolved in 30 mL DMF and 9 g pyridine is added to the solution drop-wise. 17 g furan maleimide adduct and triethylamine are added drop-wise. Stirring is continued after addition. The resulting solution is distilled under reduced pressure and the residue is refluxed in toluene for 10 to 30 hours to produce Maleimide 7 monomer.

An exemplary Maleimide 8 monomer (FIG. 4H) where m=2 and n=2 is made by adding 10 g succinic anhydride to a solution of 3.4 g pentaerythritol in ~100 mL N,N-dimethylformamide (DMF) with magnetic stirring. The solution is heated to 90° C. for 10 to 30 hours with a base, such as potassium tert-butoxide. Solvent is removed under reduced pressure. The residue is treated with an excess amount of thionyl chloride to give the acid chloride. 14.5 g N-hydroxyethylmaleimide and 9 g pyridine are added together. The resulting solid is filtered and the solvent is distilled under reduced pressure to produce Maleimide 8 monomer.

An exemplary Maleimide 9 monomer (FIG. 4I) where n=12 and x=oxygen is made by adding 11.6 g of diglycolic anhydride to a solution of 3.4 g pentaerythritol in 100 mL N,N-dimethylformamide (DMF) with magnetic stirring. The solution is heated to 90° C. for 10 to 30 hours. Solvent is removed under reduced pressure. The residue is treated with an excess amount of thionyl chloride to give the acid chloride. 14.5 g N-hydroxyethylmaleimide and 9 g pyridine are then added to produce the Maleimide 9 monomer.

Maleimide monomers having formula (9) are made in the same manner as the above-described monomers except that glycerin is substituted for pentaerythritol as a starting material. Maleimide monomers having formula (10) are made in the same manner as above except that meso-erythritol is substituted for pentaerythritol. Maleimide monomers having formula (11) are made in the same manner as above except that xylitol is substituted for pentaerythritol. Maleimide monomers having formula (12) are made in the same manner as above except that mannitol is substituted for pentaerythritol. Maleimide monomers having formula (13) are made in the same manner as above except that glucose is substituted for pentaerythritol. Maleimide monomers having formula (14) are made in the same manner as above except that xylose is substituted for pentaerythritol.

An exemplary polymeric compound is one where furan monomer Furan 1 and maleimide monomer Maleimide 1 are mixed together and cured for a sufficient time and at a sufficient temperature to form a polymeric material wherein the covalent cross-linking bonds are thermally reversible. Numerous other furan/maleimide monomer combinations are possible. The furan monomers and maleimide monomers are mixed together to form a pre-polymer mixture that is thermally cured to form the final polymeric material. The weight ratio of furan monomer to maleimide monomer in the pre-polymer mixture may be varied depending upon the particular monomers being used. In general, the weight ratios of furan monomers to maleimide monomers will vary between 0.5 to 1 and 2 to 1. Preferably, the monomers will be mixed in stoichiometric ratios of furan and maleimide moieties so that an excess of one monomer or another is not present in the finally cured polymeric material. The amount of furan monomer and maleimide monomer required in the pre-polymer mixture may be determined utilizing the well known principals of the Diels-Alder reaction.

Curing of the pre-polymer mixture simply involves heating the pre-polymer mixture to a sufficient temperature for a sufficient time to form the thermally reversible covalent bonds and the resulting polymeric material. Generally, the pre-polymer mixture will be heated to temperatures of between about 20° C. and 40° C. for periods of from 5 minutes to 2 hours. The preferred temperature range for thermally curing the pre-polymer mixture is from 80° to 120° C.

Upon cooling, the cured polymeric material in accordance with the present invention is a relatively tough solid at room temperature and below. The polymeric material is generally transparent and has mechanical properties similar to those of commercial epoxy resins.

Figure 1:
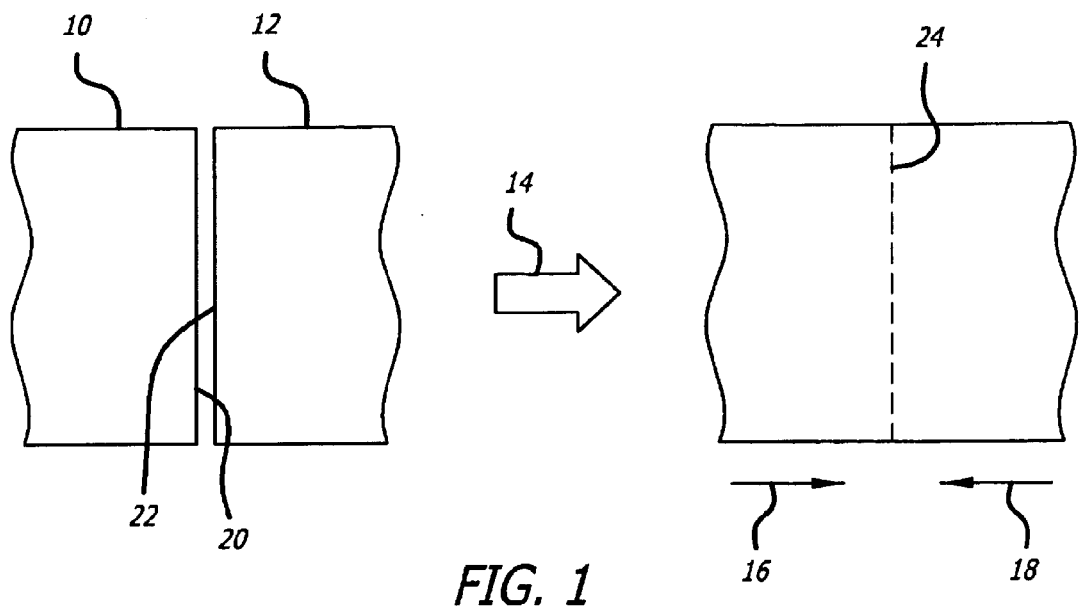
FIG. 1 is a schematic representation of a method in accordance with the present invention for thermally welding two polymeric bodies together.

As shown in FIG. 1, a first polymeric body 10 can be thermally joined or welded to a second polymeric body 12 by thermally heating the two bodies (as represented by arrow 14) and moving the two bodies together as represented by arrows 16 and 18. The surface 20 of the first polymeric body 10 is heated to a sufficient temperature and for a sufficient time to disconnect at least a portion of the thermally reversible covalent bonds located at the surface to thereby provide a bondable surface. Likewise, the surface 22 of the second polymeric body 12 is heated to a sufficient temperature and for a sufficient time to form a bondable surface. The two bodies or parts 10 and 12 are then contacted and cooled to provide formation of thermally reversible covalent bonds between the first and second bondable surfaces 20 and 22 to thereby join the polymeric bodies together as represented by phantom line 24.

A wide variety of procedures are possible for thermally welding both simple and complex polymeric bodies together. Thermal welding can be accomplished by heating only the surfaces that are to be welded. Alternatively, the entire polymeric body may be heated and the welding accomplished by simply moving the various parts together. Alternatively, the parts may all be placed in contact with each other and simply heated to temperatures above 120° for a sufficient time to allow the surfaces to weld together followed by cooling to form the final structure. The invention is particularly well suited for joining multiple complex polymeric bodies together wherein the various body surfaces are all placed in contact with each other and the entire assembly heated sufficiently to allow covalent bonding between the surfaces followed by cooling to form the final bonds. Accordingly, it will be understood by those skilled in the art that the simple joining of two surfaces together as shown in FIG. 1 is exemplary only and that the present invention covers the welding or thermal joining of much more complicated assemblies.

Figure 2:
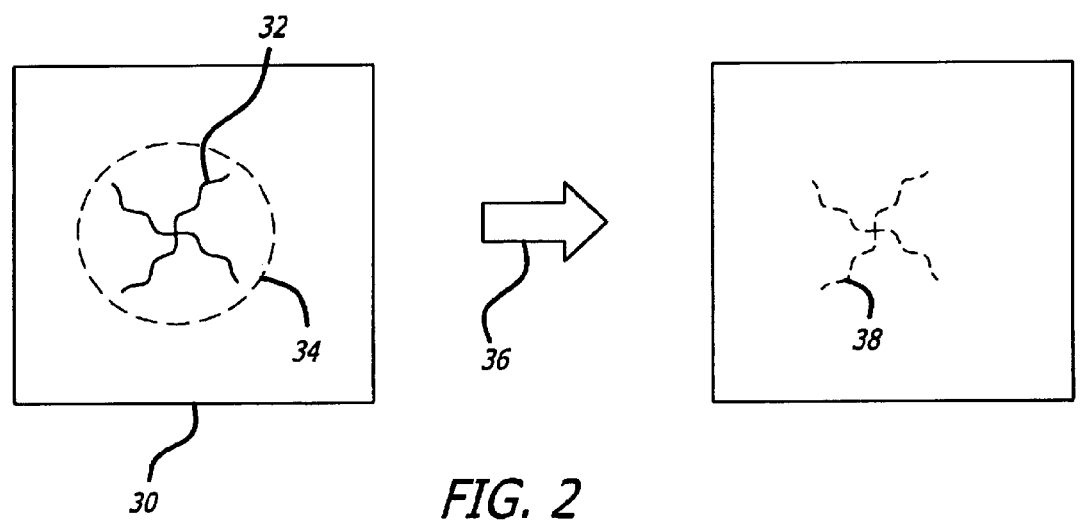
FIG. 2 is a schematic representation of a method in accordance with the present invention for thermally repairing a polymeric body having a fracture therein.

In addition to thermally joining polymeric bodies together, the present invention involves methods for repairing or re-mending fractures in the polymeric body. For example, as represented in FIG. 2, a polymeric body 30 is shown having a fracture 32 that is located at a fracture site represented in phantom at 34. In accordance with the present invention, the fracture 32 is simply repaired by heating the fracture site 34 to a sufficient temperature for a sufficient time to disconnect at least a portion of the thermally reversible covalent bonds located on either side of the fractures. The heating step is represented by arrow 36 in FIG. 2. The polymeric body 30 is maintained at the bond-disconnect temperature for a period long enough to allow interaction of the thermally reversible covalent bonds on both sides of the fracture interfaces. Then, the mended fracture is cooled to a temperature that is low enough (e.g. room temperature) to form the thermally reversible covalent bonds and provide repair of the fracture as represented in phantom at 38. In addition to fracture repairs, the polymeric bodies may be heat treated in order to remove stresses and strains in the material prior to actual fracture development. The heat treating process simply involves heating the polymeric body to temperatures on the order of 120° C. and above for a sufficient time to disconnect at least a portion of the covalent bonds followed by cooling to room temperature to re-form the bonds. Typically, it is preferred that on the order of 30% of the covalent bond linkages be disconnected. However, heat treating, fracture repair and welding operations are possible where the percentage of bonds disconnecting is on the order of 30% to 100% covalent linkage disconnect.

Examples of practice are as follows:

Thermally reversible reactions, particularly the Diels-Alder (DA) reaction, for cross-linking linear polymers have been pioneered and studied by Kennedy and Wagener during the past two decades (15–21). To the best of our knowledge, as shown in all the reports of thermoreversible polymers, cross-linkable and reversible groups were attached to linear polymer backbones, but the connections of the cross-linkers to the polymer backbones were not reversible (15–21). In contrast, the present invention involves macromolecular networks formed in their entirety by reversible cross-linking covalent bonds.

EXAMPLE 1

Figure 5:
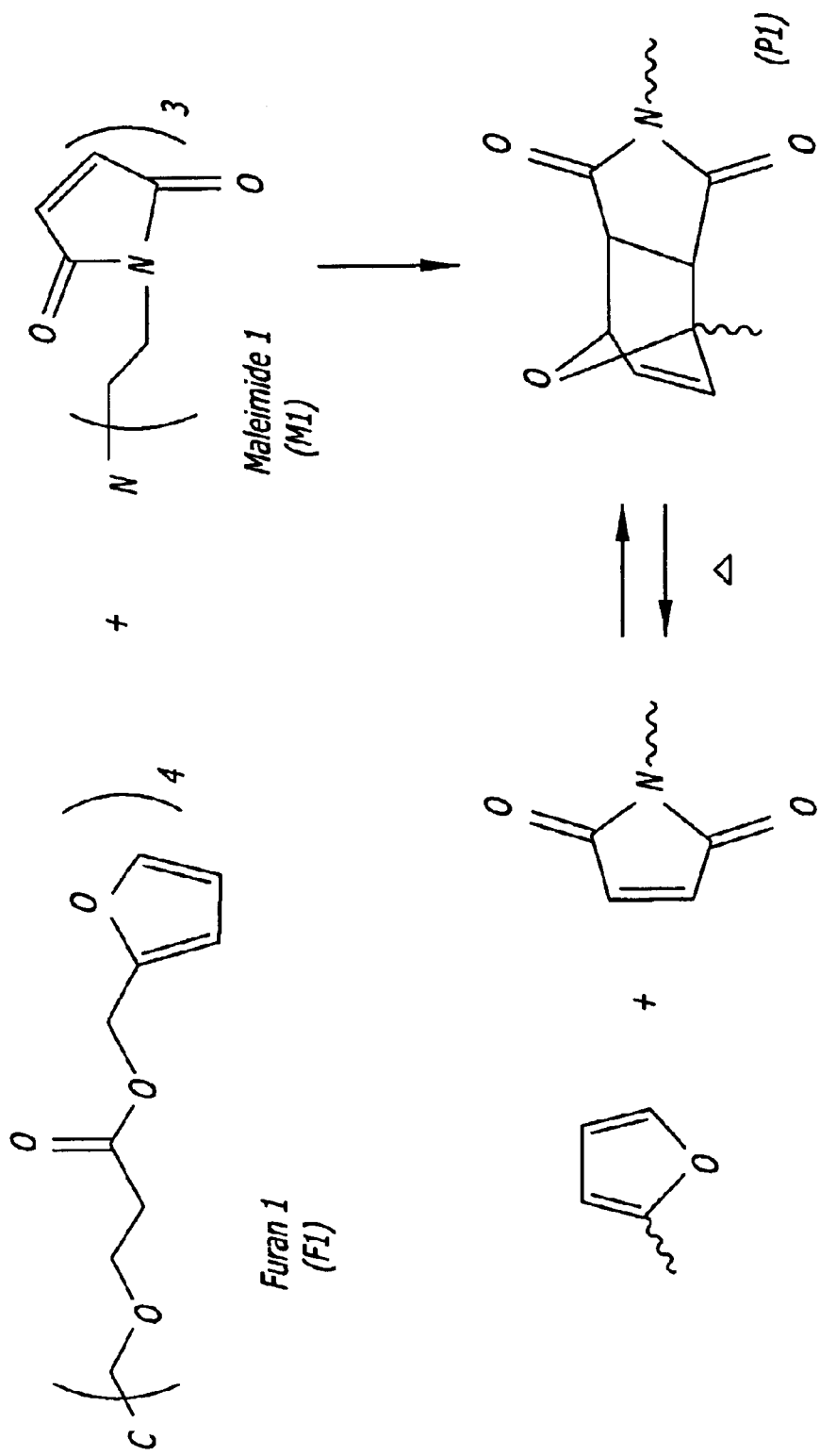
FIG. 5 depicts the pathway for the formation and re-mending of an exemplary polymer in accordance with the present invention.

A thermally reversible DA cycloaddition of a multi-diene (multi-furan, F1) and multi-dienophile (multi-maleimide, M1) was used to prepare a polymeric material as shown in FIG. 5. Monomer F1 contains four furan moieties on each molecule, and monomer M1 includes three maleimide moieties on each molecule. Details of the synthesis of F1 and M1 are as follows:

Monomer F1. 6,6-bis(carboxy-2-oxabutyl)-4,8-dioxaundecane-1,11-dicarboxylic acid was prepared according to the literature [G. R. Newkome, C. D. Weis, *Org. Prep. Proc. Int.* 28, 242, (1996)]. All other reagents, exo-3,6-epoxy-1,2,3,6-tetrahydrophthalic anhydride, dimethyl formamide (DMF), $Ac_2O$, $Et_3N$, $Ni(OAc)_2(4H_2O)$, $SOCl_2$, $CH_2Cl_2$, toluene, pyridine, furfuryl alcohol, were purchased from Aldrich (Milwaukee, Wis.), Fisher (Pittsburgh, Pa.), or Acros (Geel, Belgium) and used without purification. To a 1-L round bottom flask equipped with a magnetic stirrer, 54.7 g (0.129 mol) 6,6-bis(carboxy-2-oxabutyl)-4,8-diooxaudanecane-1,11-dicarboxylic acid, 200 ml $CH_2CL_2$ and 125 (1.71 mol) $SOCl_2$ were added and refluxed overnight, followed by evaporation of $CH_2CL_2$. Benzene was then added and distilled. The residue was dissolved in 250 ml of freshly distilled THF. A mixture of freshly distilled furfuryl alcohol (60 ml, 0.695 mol) and pyridine (57 ml, dried over $CaH_2$) was added dropwise over a period of 1 hour and stirring was continued for 2 hours. A white precipitate was filtered off and THF was removed on a rotary evaporator. The residue was redissolved in 250 ml of $CH_2Cl_2$ and washed with water (300 ml, three times). The organic layer was dried, concentrated and chromatographed on about 400 g of alumina, using ethyl acetate as solvent. The solvent was distilled and the final product was obtained as a liquid and was evacuated in high vacuum for 2 days at 70° C. The yields were approximately 80–90%.

$H^1$-NMR ($CDCl_3$): 7.40(4H, Q), 6.39(4H, 2D), 6.34(4H, 2D), 5.06(8H, 3.27(8H, S), 2.54(8H, T).

$C^{13}$-NMR ($CDCl_3$): 171.34, 149.48, 143.24, 110.64, 110.57, 69.36, 66.60, 45.28, and 34.95.

FT-1R: 1736, 1170, 1105 $cm^{-1}$.

| Elemental Analysis of F1 | | |
|---|---|---|
| (%) | C | H |
| Calculated | 59.76 | 5.83 |
| Found | 59.67 | 5.95 |

Monomer M1. 25 ml (0.167 mol) tris(2-aminoethyl) amine was dissolved in 100 ml of DMF in a 2L round bottom flask with magnetic stirring and heated to 75° C. A solution of 100 g (0.602 mol) exo-3,6-epoxy-1,2,3,6-tetrahydrophthalic anhydride and 250 ml of DMF was added to the flask dropwise over 1 hour. Stirring was continued for 2 hours. Then 200 ml of $Ac_2O$, 10 ml of $Et_3N$, and 1 g of $Ni(OAc)_2(4H_2O)$ were added. Stirring was continued for 3 hours at 75° C. Water (100 ml) was added and the solvent was distilled under vacuum at 60° C. The residue was then redissolved in 1.5 l of $CH_2Cl_2$ and washed with 3 l of $H_2O$. The organic layer was collected and $CH_2Cl_2$ was removed on a rotary evaporator. The residue was chromatographed on about 800 g silica gel (the silica gel had been pretreated with 40 ml $Et_3N$). The crude product was collected and refluxed overnight in 600 ml of toluene under $N_2$. The toluene solution was filtered and allowed to cool. Yellow needle crystals were obtained from toluene. The yields were approximately 52–61%. $H^1$-NMR ($CDCl_3$): 6.67 (6H, S); 3.52 (6H, T); 2.71 (6H, T) Melting Point: 113–114° C.

A dichloromethane solution of monomers F1 and M1 (with stoichiometric F:M ratio) was poured into a glass mold or cast on a quartz plate. Vacuum evaporation of the solvent at room temperature followed by heating produced the macromolecular solid. A highly cross-linked network is formed via the DA reaction of furan and maleimide moieties, and thermal reversibility can be accomplished by the retro-DA reaction (22). An exemplary procedure is as follows.

Polymer P1 (FIG. 5). 7.128 g (9.572 mmol) of monomer F1 and 4.931 g (12.77 mmol) of monomer M2 were dissolved in 50 ml $CH_2Cl_2$ and dried over $MgSO_4$. The solution was filtered and most of the $CH_2Cl_2$ was evaporated over 20 minutes, leaving a viscous solution which was stirred for 20 minutes and the remaining solvent was removed under high vacuum over 20 minutes. The residue, very viscous liquid, was then poured into a glass mold and the bubbles resulting from the pouring were removed by centrifugation. The sample was kept at 24° C. for 14 hours and then 60° C. for 5 hours and 95° C. for 20 hours. The glass mold was then broken to obtain a transparent polymer.

Polymerization of P1 at different temperatures was studied by ultraviolet (UV) spectroscopy. Monoliths of polymeric material (P1) were obtained by breaking the glass mold, whereas thin films were produced when cast on quartz substrates. Because the polymerization process involves the formation of DA adducts, the efficiency of the DA reaction can be used to study the degree of polymerization. According to the literature (19), the extent of the DA reaction for a similar system can be followed quantitatively by UV spectroscopy. Polymerization of up to 60 to 70% required 5 days. The polymerization-cross-linking process is much faster at higher temperatures, reaching "completion" (95%±5%) in just 3 hours at 75° C.

Differential scanning calorimetry (DSC) showed that the polymerization process is exothermic by 23 kcal/mol (per DA adduct) (23). Assuming the principle of microscopic reversibility applies, this result implies that upon heating the retro-DA reaction is an accessible reaction pathway that is preferred over (nonreversible) bond-breaking degradation reactions (24) in the polymer network.

The bulk polymeric material P1 was hard and fully transparent, with a density of 1.37 g/cm$^3$ and an index of refraction of 1.56 at 24° C. On the basis of a nondestructive ultrasonics technique (25), the Young's modulus and Poisson ratio were determined to be 4.72 GPa and 0.349, respectively. The mechanical properties of this polymer (P1) are in the range of commercial, state-of-the art, cross-linked epoxy resins and unsaturated polyesters (1, 31).

Solid-state reversibility (27) was tested via a series of heating cycles that consisted of heating fully polymerized films to different temperatures on quartz substrates and then quenching in liquid nitrogen. After the heat quench procedure, the samples were heated at 80° C., causing repolymerization and/or cross-linking of the films. About 25% of the DA adducts disconnected after thermal treatment at 150° C., but only approximately 12% did so after treatment at 130° C. Under these conditions, the sample was observed to be irreversible below 120° C. Prolonged storage of the films at 80° C. afforded full reconnection of the DA partners. Whereas in the solid state the reversibility is observable only to the extent of approximately 10% to 20%, a suspension of a 350 mg sample of a monolith of P1 in 50 ml chlorobenzene dissolved completely upon heating to reflux over approximately 1 hour.

Samples with different thermal history were studied by temperature-modulated DSC (TMDSC). This type of thermal analysis is used to determine and distinguish between (i) fully reversible heat effects that are related to the heat capacity change and (ii) time-dependent irreversible heat effects that are related to kinetics (26, 27). A fully polymerized sample, which was cooled from 145° to 25° C. in 24 hours, showed only an endothermic peak at 124° C. The shape is typical for physical aging effects (28). A sample that was kept at 145° for 25 minutes and quenched in liquid nitrogen showed an exothermic peak from 60° to 120° C. on the nonreversing heat flow curve. These results indicate that the quenched sample contains disconnected furan and maleimide moieties and, as the molecular chains gain enough mobility at increased temperature, they reconnect efficiently. At temperatures above 120° C., endothermic peaks in both nonreversing heat flows (due to the retro-DA reaction in the network) were observed.

EXAMPLE 2

To determine the fracture-mending efficiency of the P1 polymer, tests were performed with the use of compact tension test specimens (4, 12). The compact tension test specimens were made according to the literature (Y. Murakami, Ed., *Stress Intensity Factors Handbook* (Pergamon, Tokyo, 1987), vol. 1, p. 18), with W=12 mm, t=6 mm and a/W approximately 0.4, where W is width, t is thickness, and a is length of notch. The fracture toughness ($K_{1c}$) can be determined as $K_{1c}=aP_c$ where a is a geometry and materials property, which can be calculated from the equation shown in the work cited in this reference, and $P_c$ is the critical load at fracture (4), a was measured to be $1.1 \times 10^4$ m$^{-3/2}$. The fracture energy ($G_{1c}$) value can be calculated according to the literature (7), $G_{1c}=(1-v^2) K_{1c}^2/E$, where v is the Poisson ratio and E is Young's modulus. Therefore, in terms of fracture energy, the best value of re-mending efficiency was 32%, and the average efficiency for a number of specimens (after thermal treatment at 150° C.) was 25%.

A sharp pre-crack was created in the tapered samples by gently tapping a fresh razor blade into a machined starter notch. Application of a load in the direction perpendicular to the pre-crack, led to a fracture of the specimen because it was not possible to stop the crack propagation. After structural failure, the two pieces were matched as closely as possible and held together with a clamp, treated at 120° to 150° C. under nitrogen for about 2 hours, and cooled to room temperature. Before mending, the interface of the crack was highly reflectant. After thermal treatment, only a slight interface mismatch was observable, indicating mending (healing) of the interface.

Fracture tests were also carried out in an effort to quantify the healing efficiency (4). The tests showed a recovery of about 57% of the original fracture load. Not surprisingly, the accurate replacing of the two halves and thermal treatment temperatures affected the mending efficiencies. At 150° C., an average mending efficiency of about 50% was achieved, whereas at 120° C. the average value was 41%. Considering that the specimens were split into two separate pieces and kept under the same atmospheric pressure sometimes as long as 24 hours, the mending efficiencies are impressive when compared with crack healing of thermoplastic elastomers (12), but they are not as high as those reported for White's composite (4).

Another factor, which should affect healing efficiency, is the uniformity and amount of applied pressure. Our preliminary results indicate that the effect of pressure appears to be minimal. The fracture and mending processes of each independently prepared specimen were carried out at least two times. Within experimental error, the critical load at fracture of the third cracking was about 80% of the second, strongly suggesting that this material can be healed efficiently multiple times. The second and third crack usually propagated along the original crack plane. However, it was not uncommon to observe cracking in a region adjacent to a scar from a previous crack. This is probably due to the fact that the healed region has different mechanical properties than the original material and is a result of the unique covalent interfacial bonding.

To test oxidative degradation of the polymer we performed some accelerated tests by heating specimens in air (at standard pressure) to 120° or 130° C. and then performing compression testing. Within the experimental error of the test, the mechanical properties showed only minor changes. Though the polymeric material P1 has the desirable and unusual properties described above, it also has properties as follows: (i) the maleimide monomer (M1) melts at a relatively high temperature, is colored (yellow), and is insoluble in monomer F1; (ii) though polymer P1 can be cured in less than an hour at 130° C., a full curing of it takes hours to complete. (iii) the service temperature of polymer P1 is 80° to 120° C., which may be too low for many applications but close to ideal for others, such as self-mending electronic packaging, where cracking occurs due to differences in thermal index of expansion. Additional details regarding the study of P1 can be found in Reference No. 30.

EXAMPLE 3

An exemplary synthesis of monomer Furan 15 is as follows:

To a 250 mL round bottom flask with magnetic stirrer, 5.6707 g (7.61 mmol) 6,6-bis (carboxy-2-oxabutyl)-4,8-dioxaudanecane-1,11-dicarboxylic acid, 50 mL $CH_2Cl_2$ and 16 mL (1.71 mol) SOClwere added and refluxed 2 hours. Then, $CH_2Cl_2$ was distilled. Toluene was then added and distilled. The residue was dissolved in 50 mL of freshly distilled THF. A mixture of freshly distilled 3-furfuryl alcohol (5 ml, 57.9 mmol) and pyridine (7 mL, dried over $CaH_2$) was added dropwise over a period of 1 hour and stirring was continued for 1 hour. A white precipitate was filtered off and THF was distilled on a ratary evaporator. The residue was redissolved in 100 mL of $CH_2Cl_2$ and washed with water (150 mL×3). The organic layer was dried, concentrated and chromatographed on about 100 g of alummina adsorption using ethyl acetate as solvent. The solvent was distilled and the final product was obtained as a liquid and was evacuated in high vacuum for 2 days at 72° C.

EXAMPLE 4

An exemplary synthesis of monomer Maleimide 2 is as follows:

15 mL (14.4 g, 45.5 mmol) DAB-Am-4 (Aldrich, Milwaukee, Wis.) was dissolved in 70 mL of DMF in a 2L round bottom flask with magnetic stirring and heated to 73° C. A solution of 38 g (0.602 mol) exo-3,6-epoxy-1,2,3,6-tetrahydrophthalic anhydride and 250 mL of DMF was added to the flask dropwise over 3 hours. Stirring was continued for 3 hours. Then 65 mL of $Ac_2O$, 3 mL of $Et_3N$ and 0.5 g of $Ni(OAc)_2·4H_2O$ were added, respectively. Stirring was continued for 3 hours at 75° C. 20 mL of water was added and the solvent was distilled under vacuum at 60° C. The residue was then redissolved in 500 mL of $CH_2Cl_2$ and washed with 1.5 L of $H_2O$. The organic layer was collected and $CH_2Cl_2$ was removed on a rotary evaporator. The residue was chromatographed on about 300 g silica gel (silica gel had been pretreated by 40 mL $Et_3N$). The crude product was collected and refluxed over night in 600 mL of toluene under $N_2$ with a helical column. The toluene solution was filtered out and yellow needle crystals were obtained from toluene. The yields were 41~50%.

$^1$H-NMR ($CDCl_3$): 1.36 (4H, broad s); 1.69 (8H, m, J=7.2 Hz); 2.38 (12H, m); 3.55 (8H, J=7.4 Hz, t).

$^{13}$C-NMR ($CDCl_3$): 170.85; 134.10; 53.67; 51.22; 36.33; 26.16; 24.73.

| Elemental Analysis: (%) | C | H | N |
|---|---|---|---|
| Calcd: | 60.37 | 6.33 | 13.20 |
| Found: | 60.34 | 6.46 | 13.11 |

EXAMPLE 5

An exemplary synthesis of monomer Maleimide 3 is as follows:

To a 250 mL round bottom flask with magnetic stirrer, 3.36 g (7.92 mmol) 6,6-bis(carboxy-2-oxabutyl)-4,8-dioxaudanecane-1,11-dicarboxylic acid, 50 mL $CH_2Cl_2$ and 25 mL (1.71 mol) $SOCl_2$ were added and refluxed over night. Then, $CH_2Cl_2$ was distilled. Benzene was then added and distilled. The residue was dissolved in 50 mL of freshly distilled THF. A mixture of hydroxylethylmaleimide (HEMI) (4.69 g, 33.3 mmol) and diisopropylethyl amine (13 mL, dried over $CaH_2$) was added dropwise over a period of 25 mins and stirring was continued for 30 mins. A white precipitate was filtered off and THF was distilled on a rotary evaporator. The residue was redissolved in 250 mL of $CH_2Cl_2$ and washed with 3% HCl/water (100 mL×2) followed by water (100 mL×2). The organic layer was dried over magnesium sulfate, concentrated and chromatographed on about 150 g silica using ethyl acetate as solvent. The solvent was distilled to yield a viscous brown product.

EXAMPLE 6

An exemplary synthesis of monomer Maleimide 4 is as follows:

To a 250 mL round bottom flask with magnetic stirrer, 4-(2,5-Dihydro-2,5-dioxo-1H-pyrrol-1-yl)-benzoic acid (3.09 g, 14.2 mmol), 20 mL Toluene, 2 drops of Dimethyl formamide (DMF), 25 mL $SOCl_2$, were added and refluxed for about 3 hours. Then, benzene was added and distilled. 50 mL distilled THF, and a mixture of pyridine (6 mL) and tetrakis(5-hydroxy-2-oxapentyl)methane (1.50 g, 3.21 mmol) were added to the flask. The solution was heated to reflux for 30 mins. A white precipitate was filtered off and THF was distilled on a rotary evaporator. The residue was redissolved in 100 mL of $CH_2Cl_2$ and washed with 5% HCl/water (150 mL×2), followed by water (200 mL×2). The organic layer was dried, concentrated and chromatographed on about 150 g of silica using ethyl acetate as solvent. The solvent was distilled to obtain brownish viscous product.

EXAMPLE 7

An exemplary synthesis of monomer Maleimide 5 is as follows:

The monomer Maleimide 5 can be synthesized from tertaaminopropyl pentaerythritol and exo-3,6-epoxy-1,2,3,6-tetrahydrophthalic anhydride using the same synthesis method as set forth in Example 4 for monomer Maleimide 2.

EXAMPLE 8

An exemplary synthesis of a remendable polymer in accordance with the present invention wherein monomer Furan 1 is combined with monomer Maleimide 4 is as follows:

A typical procedure is as following: 0.8392 g (1.13 mmol) of F1 and 1.032 g (1.13 mmol) of Maleimide 2 were dissolved in 10 mL $CH_2Cl_2$. $CH_2Cl_2$ was then distilled in vacuum over 20 min. A gel was formed and poured in to a glass mold. Bubbles were removed by centrifuge. The gel was heated to 50° C. for 14 hours and then 100° C. to 110° C. for 24 hours. The glass mold was then removed to obtain a transparent remendable polymer.

EXAMPLE 9

An exemplary synthesis of a remendable polymer in accordance with the present invention wherein monomer Furan 1 is combined with monomer Maleimide 2 is as follows:

0.4476 g (0.602 mmol) of Furan 1 and 0.5678 g (0.210 mmol) of Maleimide 2 were dissolved in 3 mL $CH_2Cl_2$. $CH_2Cl_2$ was then distilled in vacuum over 20 min. A viscous liquid was then poured into a glass mold and the bubbles were removed by centrifuging. The sample was kept at 24° C. for 14 hours and then 60° C. for 2 hours and 95° C. for 6 hours. The glass mold was then removed to obtain a transparent remendable polymer.

Having thus described exemplary embodiments of the present invention, it should be noted by those skilled in the art that the within disclosures are exemplary only and that various other alternatives, adaptations, and modifications may be made within the scope of the present invention. Accordingly, the present invention is not limited to the specific embodiments as illustrated herein, but is only limited by the following claims.

BIBLIOGRAPHY

1. S. H. Goodman, Ed., *Handbook of Thermoset Plastics* (Noyes, Park Ridge, N.J., ed. 2, 1998).
2. T. Kaiser, *Prog. Polym. Sci.* 14, 373 (1989).
3. J. A. Sauer, M. Hara, *Adv. Polym. Sci.* 91/92, 69 (1990).
4. S. R. White et al., *Nature* 409, 794 (2001).
5. R. Talreja, Ed., *Damage Mechanics of Composite Materials* (Elsevier, Amsterdam, 1994), pp. 139–241.
6. A. J. Kinloch, *Adv Polym. Sci.* 72, 45 (1985).
7. R. P. Wool, *Polymer Interfaces: Structure and Strength* (Hanser Gardner, Cincinnati, 1995), pp. 445–479.
8. C. B. Bucknell, I. C. Drinkwater, C. R. Smith, *Polym. Eng. Sci.* 20, 432 (1980).
9. K. Jud, H. H. Kausch, J. G. Williams, *J. Mater. Sci.* 16, 204 (1981).
10. E. P. Wang, S. Lee, J. Harmon, *J. Polym. Sci. Polym. Phys. Ed. B* 32, 1217 (1994).
11. C. B., Lin, S. Lee, K. S. Liu, *Polym. Engl. Sci.* 30, 1399 (1990).
12. J. Raghavan, R. P. Wool, *J. Appl. Polym. Sci.* 71, 775 (1999).
13. C. M. Dry, N. Sottos, Smart Structures and Materials 1993: Smart Materials, SPIE Proceedings 1916, 1 to 4 Feb. 1993, Albuquerque, N. Mex., V. K. Varadan, Ed. (SPIE, Bellingham, Wash., 1993), p. 438.
14. C. Dry, *Comp. Struct.* 35, 263 (1996).
15. L. P. Engle, K. B. Wagener, *J. Macromol. Sci. Rev. Macromol. Chem.* C33 (3), 239 (1993).
16. J. P. Kennedy, K. F. Castner, *J. Polm. Sci. Polym. Chem. Ed.* 17, 2039 (1979).
17. Y. Chujo, K. Sada, T. Saegusa, *Macromolecules* 23, 2636 (1990).
18. J. R. Jones, C. L. Liotta, D. M. Collard, D. A. Schiraldi, *Macromolecules* 32, 5786 (1999).
19. Y. Imai, H. Itoh, K. Naka, Y. Chujo, *Macromolecules* 33, 4343 (2000).
20. J. R. McElhanon, D. R. Wheeler, *Org. Lett.* 3, 2681 (2001).
21. C. Goussé, A. Gandini, P. Hodge, *Macromolecules* 31, 314 (1998).
22. B. Rickborn, *Org. React.* 52, 1 (1998).
23. J. M. Barton, *Adv. Polym. Sci.* 72, 111 (1985).
24. N. S. Isaacs, *Physical Organic Chemistry* (Longman Scientific and Technical, 1997).
25. R. C. McMaster, Ed., *Nondestructive Testing Handbook* (American Society for Nondestructive Testing, ed. 2, 1982).
26. M. Ribeiro, J.-P. E. Grolier, *J. Therm. Anal. Cal.* 57, 253 (1999).
27. M. Pyda, B. Wunderlich, *J. Polym. Sci. Polym. Phys. Ed. B* 38, 622 (2000).
28. M. Song, *J. Therm. Anal. Cal.* 63, 699 (2001).
29. J. E. Mark, Ed., *Polymer Data Handbook* (Oxford Univ. Press, New York, 1999), pp. 91 and 464.
30. X. Chen et al., *Science*, Vol. 295, Mar. 1, 2002, pp. 1698–1702.

What is claimed is:

1. A composition of matter that is made by a process comprising the steps of:

mixing furan monomers with maleimide monomers to form a pre-polymer mixture wherein said furan monomers comprise at least four furan moieties and said maleimide monomers comprise at least three maleimide moieties; and curing said pre-polymer mixture for a sufficient time and at a sufficient temperature to form thermally reversible covalent bonds between said furan moieties and said maleimide moieties to thereby provide said composition of matter.

2. A composition of matter according to claim 1 wherein said maleimide monomers comprise at least four maleimide moieties.

3. A composition of matter according to claim 1 or 2 wherein said furan monomers are selected from the group consisting of monomers having the formula

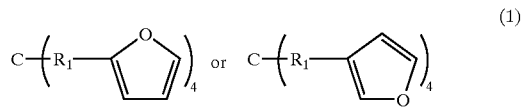

(1)

where $R_1$ is a straight or branched oxygen, nitrogen or sulfur containing carbon compound having from 2 to 20 carbon atoms;

(2)

(3)

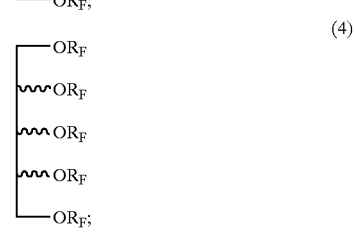

(4)

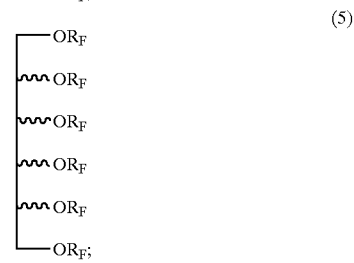

(5)

-continued (6)
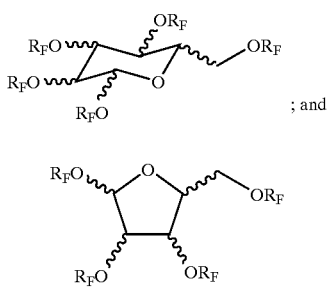
; and (7)
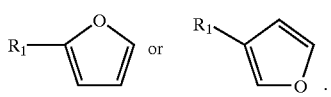

where $R_F$ is

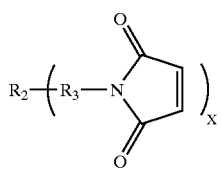

4. A composition of matter according to claim 1 wherein said maleimide monomers are selected from the group of monomers having the formula (8)
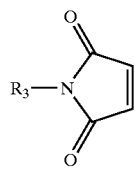

where $R_2$ is C or N, $R_3$ is a straight or branched carbon compound having from 2 to 20 carbon atoms and which may or may not contain oxygen or other heteroatoms and where X is from 3 to 6;

(9)
$$\left\{\begin{array}{l}-OR_M\\-OR_M\\-OR_M\end{array}\right.;$$

(10)
$$\left\{\begin{array}{l}-OR_M\\\sim OR_M\\\sim OR_M\\-OR_M\end{array}\right.;$$

(11)
$$\left\{\begin{array}{l}-OR_M\\\sim OR_M\\\sim OR_M\\\sim OR_M\\-OR_M\end{array}\right.;$$

(12)
$$\left\{\begin{array}{l}-OR_M\\\sim OR_M\\\sim OR_M\\\sim OR_M\\\sim OR_M\\-OR_M\end{array}\right.;$$

(13)
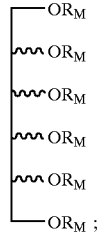
; and

(14)
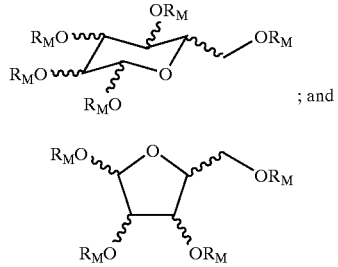

where $R_M$ is

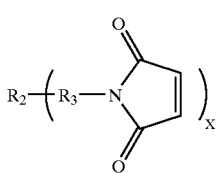

5. A composition of matter according to claim 3 wherein said maleimide monomers are selected from the group consisting of monomers having the formula (8)
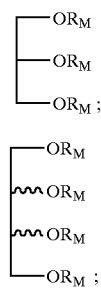

where $R_2$ is C or N, $R_3$ is a straight or branched carbon compound having from 2 to 20 carbon atoms and which may or may not contain oxygen or other heretoatoms and where X is from 3 to 6;

(9)
$$\left\{\begin{array}{l}-OR_M\\-OR_M\\-OR_M\end{array}\right.;$$

(10)
$$\left\{\begin{array}{l}-OR_M\\\sim OR_M\\\sim OR_M\\-OR_M\end{array}\right.;$$

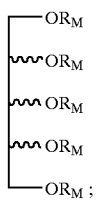 (11)

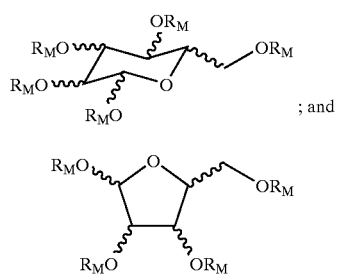 (12)

(13)

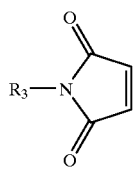 ; and (14)

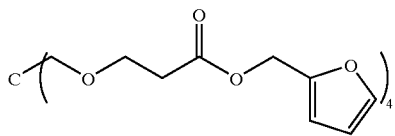

where $R_M$ is

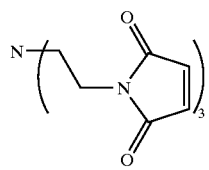

6. A composition of matter according to claim 5 wherein said furan monomers have the formula

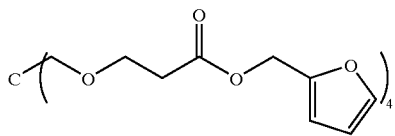

and said maleimide monomers have the formula

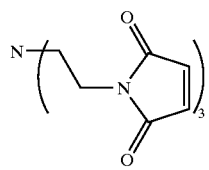

7. A method for making a composition of matter comprising the steps of:
mixing furan monomers with maleimide monomers to form a pre-polymer mixture wherein said furan monomers comprise at least four furan moieties and said maleimide monomers comprise at least three maleimide moieties and wherein said furan moieties are capable of forming thermally reversible covalent bonds with said maleimide moieties; and curing said pre-polymer mixture for a sufficient time and at a sufficient temperature to form thermally reversible covalent bonds between said furan moieties and said maleimide moieties to thereby provide said conposition of matter.

8. A method for making a composition of matter according to claim 7 wherein said maleimide monomers comprise at least four maleimide moieties;

9. A method for making a composition of matter according to claim 7 or 8 wherein said furan monomers are selected from the group consisting of monomers having the formula

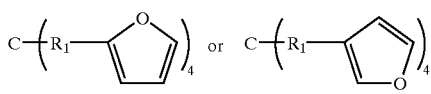 (1)

where $R_1$ is a straight or branched oxygen, nitrogen or sulfur containing carbon compound having from 2 to 20 carbon atoms;

(2)

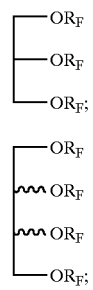

(3)

(4)

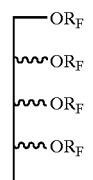

(5)

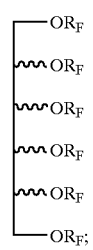

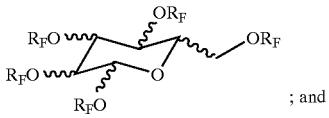 (6)

; and

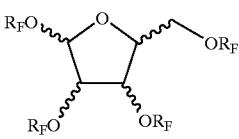 (7)

where $R_F$ is

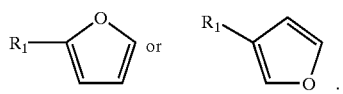

10. A method for making a composition of matter according to claim 7 wherein said maleimide monomers are selected from the group consisting of monomer having the formula (8)

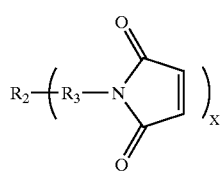

where $R_2$ is C or N, $R_3$ is a straight or branched carbon compound having from 2 to 20 carbon atoms and which may or may not contain oxygen or other heteroatoms and where X is from 3 to 6;

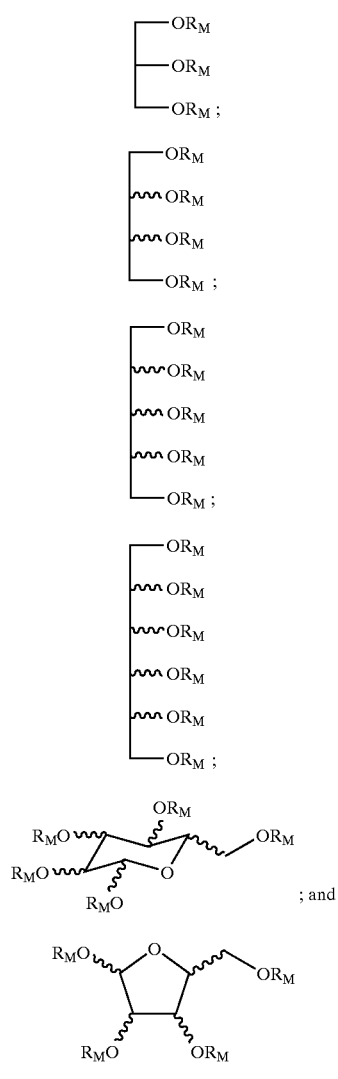

where $R_M$ is

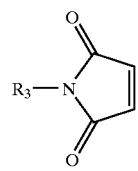

11. A method for making a composition of matter according to claim 9 wherein said maleimide monomers are selected from the group consisting of monomers having the formula (8)

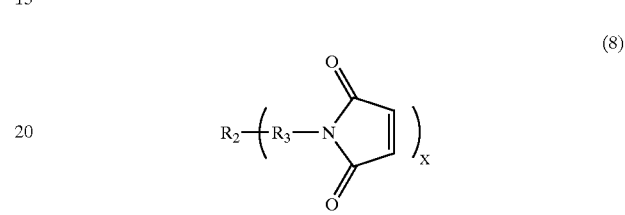

where $R_2$ is C or N, $R_3$ is a straight or branched carbon compound having from 2 to 20 carbon atoms and which may or may not contain oxygen or other heteroatoms and where X is from 3 to 6;

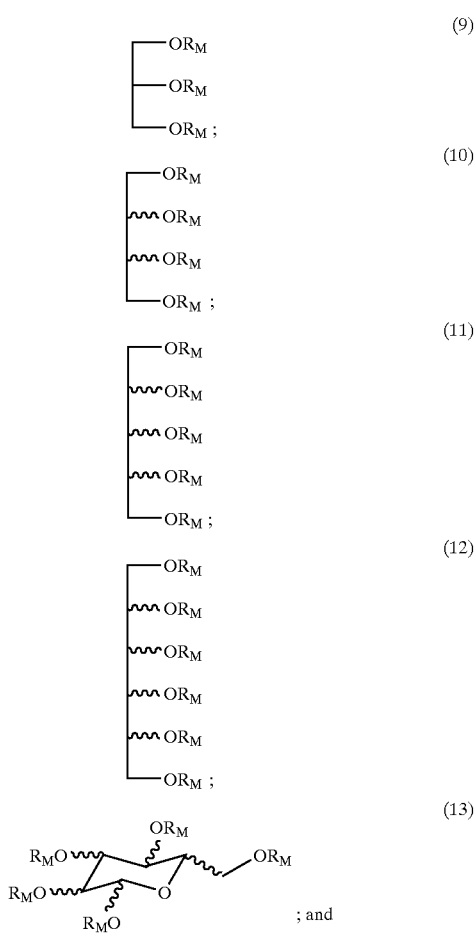

-continued
(14)
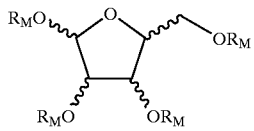
where $R_M$ is
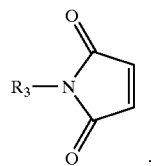
12. A method for making a composition of matter according to claim 11 wherein said furan monomers have the formula
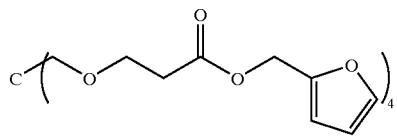
and said maleimide monomers have the formula
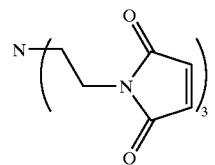
* * * * *

UNITED STATES PATENT AND TRADEMARK OFFICE
CERTIFICATE OF CORRECTION

PATENT NO.       : 6,933,361 B2                                           Page 1 of 1
APPLICATION NO. : 10/194332
DATED            : August 23, 2005
INVENTOR(S)      : Wudl et al.

It is certified that error appears in the above-identified patent and that said Letters Patent is hereby corrected as shown below:

At column 1, line 3-4 after the title of the invention, insert: -- STATEMENT REGARDING FEDERALLY SPONSORED RESEARCH OR DEVELOPMENT This invention was made with Government support under Grant No. 9796302 awarded by the National Science Foundation. The Government has certain rights in this invention. --

Signed and Sealed this

Thirteenth Day of October, 2009

David J. Kappos
*Director of the United States Patent and Trademark Office*